United States Patent [19]

Kay

[11] 3,975,624
[45] Aug. 17, 1976

[54] TWO'S COMPLEMENT SUBTRACTING SYSTEM

[75] Inventor: Darrell R. Kay, Bellevue, Wash.

[73] Assignee: The United States of America as represented by the Secretary of the Air Force, Washington, D.C.

[22] Filed: May 19, 1975

[21] Appl. No.: 578,836

[52] U.S. Cl. .............................................. 235/175
[51] Int. Cl.² ........................................ G06F 7/385
[58] Field of Search ..................... 235/168, 175, 176

[56] References Cited
UNITED STATES PATENTS 3,196,262  7/1965  Thompson .................. 235/168
3,816,734  6/1974  Brendzel ..................... 235/168

OTHER PUBLICATIONS

Langdon, "Subtraction by Minuend Complementation", IEEE Trans. on Comp., Jan. 1969, pp. 74–76.

*Primary Examiner*—Charles E. Atkinson
*Assistant Examiner*—Errol A. Krass
*Attorney, Agent, or Firm*—Joseph E. Rusz; Julian L. Siegel

[57] ABSTRACT

A two's complement subtractor using a one bit full adder for the most significant bit. A series of arithmetic logic units are fed by the respective binary bits to be subtracted with the logic units effecting internal two's complementing of the subtrahend thereby permitting adding to the minuend. The most significant input bits are in addition fed to a one bit full adder together with the carry in bit from the last arithmetic logic unit of the series. The one bit full adder outputs the most significant bit or the sign resulting from the subtraction and this adder can have either internal inversion of the subtrahend or an inverter can precede the subtrahend input.

2 Claims, 4 Drawing Figures

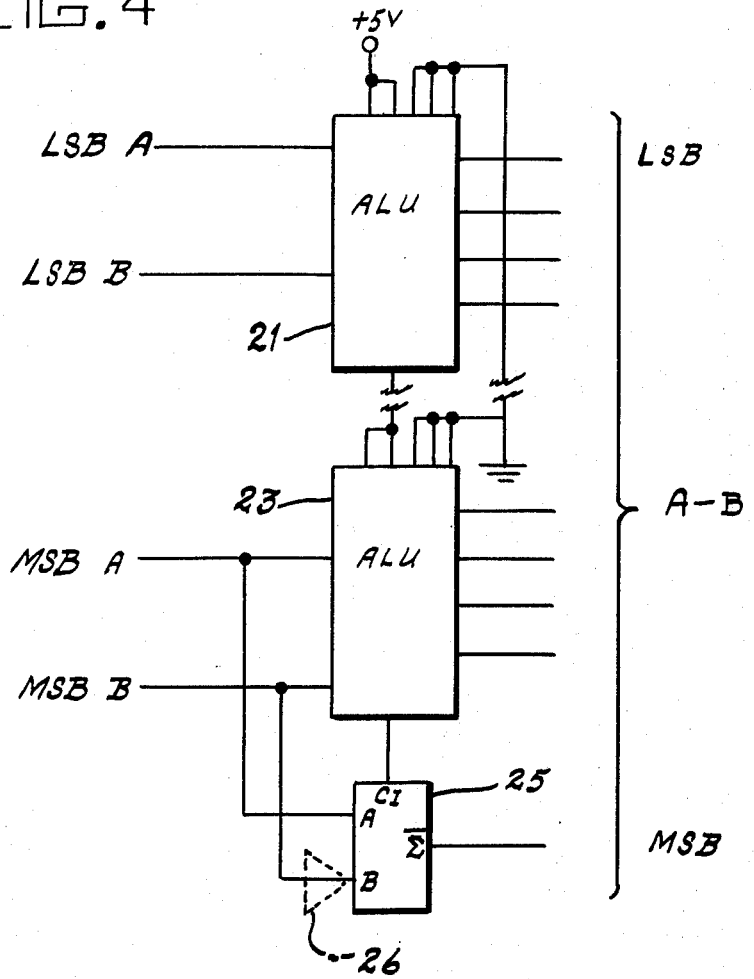
FIG. 4
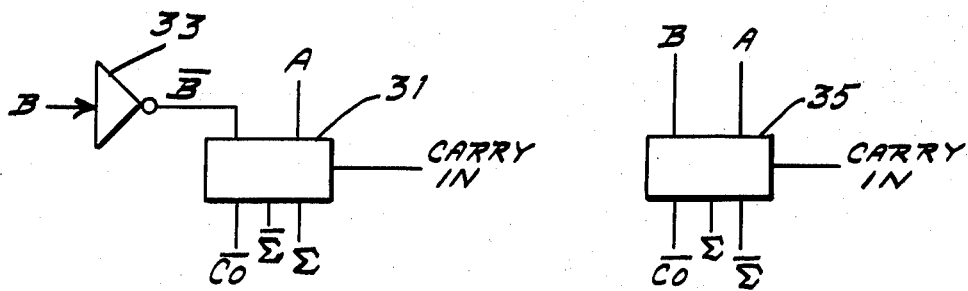
FIG. 2
FIG. 3

TWO'S COMPLEMENT SUBTRACTING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to digital computers, and more particularly to a subtracting circuit using a two's complement sum.

When subtracting, in two's complement notation, it is common practice to use arithmetic logic units (ALU's), as an example, the Fairchild 9340. Because an $n$-bit input can result in an $n + 1$ bit output, it is necessary to expand the sign bits of the inputs to two bits each. Since the arithmetic logic unit normally is a four bit device, a substantial efficiency loss occurs when the application requires expanding the sign bit such that the $4n + 1$ bits are required ($n = 1, 2, 3,$). This inefficiency results in larger physical package size, higher power dissipation, and in some cases, higher cost.

The invention employs a one bit full adder with a complement sum output to provide an efficient implementation of subtraction of two $4n$ bit numbers. Signal processing, computing and special purpose processing functions frequently employ $4n$ bit lengths, and most complex arithmetic elements are sized for multiples of 4 bits. There exists, therefore, a wide range of potential applications for this subtracting system.

SUMMARY OF THE INVENTION

The present invention uses a series of four bit output arithmetic logic units and a one bit full adder to generate the most significant bit of the output in order to effectuate two's complement summations in a binary subtractor. The normal connection of the one bit adder requires an external inversion of the bit to be subtracted; however, by using an adder with a complement sum output, such as a Fairchild 9304, the inverter can be eliminated.

It is therefore an object of this invention to provide a novel and more efficient two's complement subtracting system.

It is another object to provide a two's complement subtracting system in which one of the internal logic units (normally a 24 pin package) is replaced with a smaller one bit full adder (normally a 16 bit package).

It is still another object to provide a two's complement subtracting system having a lower power requirement.

These and other objects, features and advantages of the invention will become more apparent from the following description when taken in connection with the illustrative embodiments in the accompanying drawings.

DESCRIPTION OF THE DRAWINGS

FIG. 2 is a schematic representation showing one version of the one bit full adder used in the invention;

FIG. 3 is a schematic representation of another version of the one bit full adder used in the invention where the inverter of the version shown in FIG. 2 is eliminated; and FIG. 4 is a functional block diagram showing the embodiments of the invention.

DETAILED DESCRIPTION OF THE PREFERRED EMBODIMENTS

Figure 1:
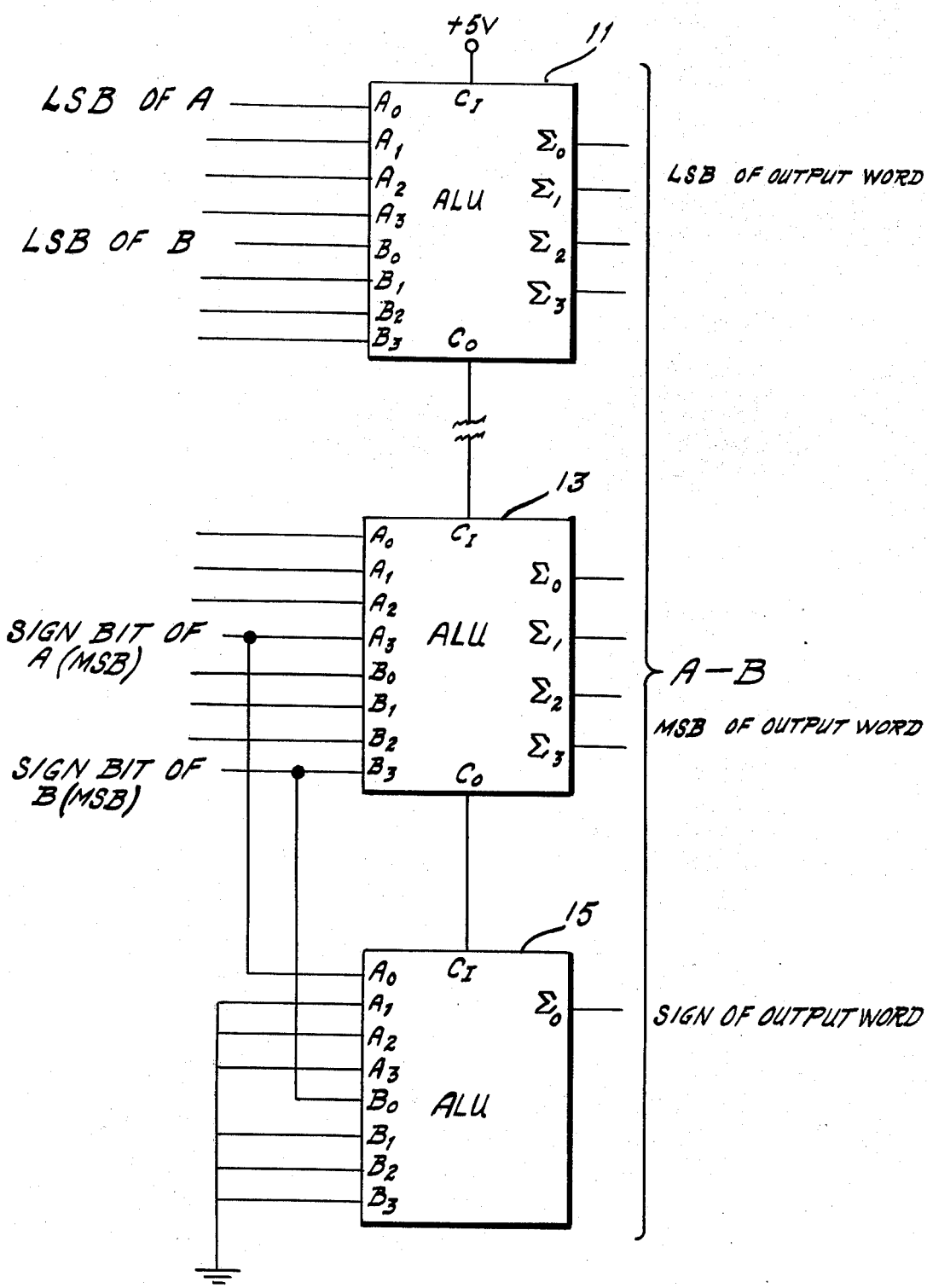
FIG. 1 is a schematic representation of a prior art subtracting circuit using a two's complement binary code.

Referring to FIG. 1, there is shown a schematic diagram representing the two's complement subtracting system commonly in use. Here there are series of arithmetic logic units (ALU) such as the Fairchild 0340. In making a subtraction of A and B where A is the minuend and B is the subtrahend the first unit 11 is fed by the least significant bits (LSB) of A and of B. The outputs of arithmetic logic unit 11 are the least significant bits of the output word which represents the desired difference. Unit 13 which is the next to last unit in the series is fed by the most significant bits (MSB) of A and B, the output of which represents the most significant bits of the output word. The sign bits of A and B are also fed to unit 15 which produces the sign of the output word. The remaining input terminals to unit 15 are not used and are connected to ground thereby showing the unnecessary use of such a unit for generating the sign bit.

In one bit full adders presently in use the normal connection requires an external inversion of the bit to be subtracted as shown in FIG. 2. Here adder unit 31 has an A and a B input, but the B input is preceded by inverter 33 thereby converting the B input to a $\bar{B}$.

As shown in FIG. 3, by using adder 35 with a complement sum output, such as a Fairchild 9304, the inverter is eliminated. The 9304 or any similar adder with a complementary output may be used to perform the function A−B for the most significant bit of two words by connecting it according to FIG. 3 and taking the output from the $\bar{\Sigma}$ output. The $\overline{CO}$ output will not have valid data but it is not used when A−B is implemented.

A comparison of the truth tables for FIGS. 2 and 3 shows the justification for this method.

| A | B | Carry In | FIG. 2$\Sigma$ | FIG. 2$\bar{\Sigma}$ | FIG. 2$\overline{CO}$ | FIG. 3$\Sigma$ | FIG. 3$\bar{\Sigma}$ | FIG. 3$\overline{CO}$ |
|---|---|---|---|---|---|---|---|---|
| 1 | 1 | 1 | 0 | 1 | 0 | 1 | 0 | 0 |
| 1 | 1 | 0 | 1 | 0 | 1 | 0 | 1 | 0 |
| 1 | 0 | 1 | 1 | 0 | 0 | 0 | 1 | 0 |
| 1 | 0 | 0 | 0 | 1 | 0 | 1 | 0 | 1 |
| 0 | 1 | 1 | 1 | 0 | 1 | 0 | 1 | 0 |
| 0 | 1 | 0 | 0 | 1 | 1 | 1 | 0 | 1 |
| 0 | 0 | 1 | 0 | 1 | 0 | 1 | 0 | 1 |
| 0 | 0 | 0 | 1 | 0 | 1 | 0 | 1 | 1 |

$2\Sigma = $ FIG. $3\bar{\Sigma}$

FIG. 4 shows an embodiment of the invention and a variation of this embodiment. Here a series of arithmetic logic units are used, such as a Fairchild 9340, for the subtraction A−B. These units have internal inversion of the subtrahends to permit two's complement summing. Arithmetic logic unit 21 represents the least significant bit for both the input and the output. Logic unit 23 represents the most significant bit for the input only. The same values that feed logic unit 23 feed one bit full adder 25 and the output of this adder is the most significant bit for A−B and represents the sign which is obtained from the $\overline{\Sigma}$ output.

Any adder or arithmetic logic may be used in place of the 9340. Also, any number of bits may be used merely by adding more 9340's or similar devices.

One bit full adder 25 as shown has internal inversion of the subtrahend to permit two's complement summing. However, as an alternative, a one bit full adder without this feature can be used by including external inverter 26 prior to the B input. In this case the sign output is obtained from the $\Sigma$ output.

An example for the use of an embodiment of FIG. 4 where $4n + 1 = 5$ is shown below.

| Function | Decimal | Binary MSB(Sign) LSB |
|---|---|---|
| A | +7 | 0 1 1 1 |
| B | +3 | 0 0 1 1 |

In the subtract mode, the arithmetic logic unit (ALU) internally complements the B input. The conversion of B to its 2's complement is completed by $C_{IN} = $ "1" within the logic unit. The effective action of the logic unit is hence

```
  A  →  0 1 1 1}  →    0 1 1 1    (A)
 −B     −0 0 1 1}    + 1 1 0 0    (Complement B, Internal to ALU)
                     +       1    (C_IN of ALU)
                       0 1 0 0    (ALU Σ OUT)
                   1              (ALU C_OUT)
```

Now considering the action of the circuit of FIG. 3 to provide the MSB, for $A_{MSB} = 0$, $B_{MSB} = 0$, $C_{IN} = 1$ (the 4-bit ALU $C_{OUT}$ output), the truth table indicates $\overline{\Sigma} = 0$, hence the output is 0 0 1 0 0, or decimal +4.

Another example is shown below where $4n + 1 = 9$:

| Function | Decimal | Binary MSB (Sign) |
|---|---|---|
| A } | +9 | 0 0 0 0 1 0 0 1 LSB |
| B } | −127 | 1 0 0 0 0 0 0 1 |

(2) 4-bit ALU's Portion:

```
  A  →    0 0 0 0 1 0 0 1   →      0 0 0 0 1 0 0 1
 −B      −1 0 0 0 0 0 0 1           0 1 1 1 1 1 1 0
                                              1      (C_IN of ALU)
                                    1 0 0 0 1 0 0 0  (ALU Σ OUT)
                                 0                    (ALU C_OUT)
```

From the circuit of FIG. 3:
$A_{MSB} = 0$, $B_{MSB} = 1$, $C_{IN} = 0$; the truth table indicates $\overline{\Sigma} = 0$, hence the answer 0 1 0 0 0 1 0 0 0, or decimal 136.

What is claimed is:

1. A two's complement system for subtracting a subtrahend from a minuend comprising:
   a. a series of interconnected four bit full adders each having a minuend input and a subtrahend input with the first of the series corresponding to the least significant bits of the minuend and the subtrahend and the last of the series corresponding to the most significant bits of the minuend and the subtrahend; and
   b. a one bit full adder forming an additional stage in the series of four bit full adders, fed by the sign bits of the minuend and the subtrahend and the carry output of the four bit full adder corresponding to the most significant bit for forming a sign bit with the one bit full adder having an internal inverter for the sum output.

2. A two's complement system for subtracting a subtrahend from a minuend comprising:
   a. a series of interconnected four bit full adders each having a minuend input and a subtrahend input with the first of the series corresponding to the least significant bit and the last of the series corresponding to the most significant bits of the minuend and the subtrahend
   b. one bit full adder forming an additional stage in the series of four bit full adders and fed by the sign bits of the minuend and the subtrahend and the carry output of the four bit full adder corresponding to the most significant bit for forming a sign bit; and
   c. an inverter preceding the subtrahend input to the one bit full adder.

* * * * *